United States Patent
Okada et al.

(10) Patent No.: US 8,212,925 B2
(45) Date of Patent: Jul. 3, 2012

(54) SYNC SEPARATION CIRCUIT

(75) Inventors: Toru Okada, Ota (JP); Hiroyuki Ebinuma, Fukaya (JP)

(73) Assignees: Sanyo Electric Co., Ltd., Osaka (JP); Sanyo Semiconductor Co., Ltd., Gunma (JP)

(*) Notice: Subject to any disclaimer, the term of this patent is extended or adjusted under 35 U.S.C. 154(b) by 788 days.

(21) Appl. No.: 12/249,515

(22) Filed: Oct. 10, 2008

(65) Prior Publication Data

US 2009/0096923 A1    Apr. 16, 2009

(30) Foreign Application Priority Data

Oct. 10, 2007   (JP) .................. 2007-264519

(51) Int. Cl.
 *H04N 5/08* (2006.01)
 *H04N 5/10* (2006.01)

(52) U.S. Cl. .............. 348/525; 348/531; 348/532

(58) Field of Classification Search .......... None
See application file for complete search history.

(56) References Cited

U.S. PATENT DOCUMENTS 4,185,299 A * 1/1980 Harford .......... 348/532
4,580,166 A * 4/1986 Okano .......... 348/531

FOREIGN PATENT DOCUMENTS

JP    11-220634    8/1999

OTHER PUBLICATIONS esp@cenet patent abstract for Japanese Publication No. 11220634, Publication date Aug. 10, 1999 (1 page).

* cited by examiner

*Primary Examiner* — Jefferey Harold
*Assistant Examiner* — Sean Haiem
(74) *Attorney, Agent, or Firm* — Osha Liang LLP

(57) ABSTRACT

A sync separation circuit separates a synchronizing signal from a video signal containing the synchronizing signal. A minimum level detecting section detects a minimum level of a video signal. A sync tip level detecting section detects a sync tip level in the video signal. A pedestal level detecting section detects a pedestal level in the video signal. Based on both the sync tip level detected by the sync tip level detecting section and the pedestal level control by the pedestal level detecting section, a slice level setting section sets a slice level corresponding to an intermediate value between the sync tip level and the pedestal level. The slice level control section sets the slice level based on the minimum level detected by the minimum level detecting section if the slice level set based on the sync tip level and the pedestal level is inappropriate.

3 Claims, 2 Drawing Sheets

SYNC SEPARATION CIRCUIT

CROSS-REFERENCE TO RELATED APPLICATION

The entire disclosure of Japanese Patent Application No. 2007-264519 filed on Oct. 10, 2007 including specification, claims, drawings, and abstract is incorporated herein by reference.

BACKGROUND OF THE INVENTION

1. Field of the Invention

The present invention relates to a sync separation circuit that separates a synchronizing signal from a video signal containing the synchronizing signal.

2. Description of the Related Art

Various video signal processing apparatuses, such as TV receivers and video players, conventionally separate a synchronizing signal from an input video signal and utilize the separated synchronizing signal to execute a process such as reproduction. The synchronizing signal is combined into the video signal during horizontal or vertical blanking intervals as a low-level signal. Then, the video signal is normally compared with a threshold value of a predetermined level, and a part of the video signal which is at a level equal to or lower than the predetermined one is then extracted. The synchronizing signal is thus separated.

The video signal has a sync tip level indicating the level of the bottom of the synchronizing signal, and a pedestal level that is the level of a porch portion on which a color burst signal is superimposed. To allow the video signal to be sliced to obtain the synchronizing signal, an intermediate level between the sync tip level and the pedestal level is often set to be a slice level.

Japanese Patent Laid-Open Publication No. Hei 11-220634 is a document relating to the above-described process.

When the intermediate level between the sync tip level and the pedestal level is set to be the slice level as described above, if a reproduction signal level of a video varies significantly during video reproduction or a reception signal level of a TV signal varies significantly owing to a weak electric field, sync separation may not always be achieved properly.

SUMMARY OF THE INVENTION

The present invention provides a sync separation circuit separating a synchronizing signal from a video signal containing the synchronizing signal, the circuit comprising minimum level detecting means for detecting a minimum level of a video signal, sync tip level detecting means for detecting a sync tip level in the video signal, pedestal level detecting means for detecting a pedestal level in the video signal, and slice level setting means for, based on the sync tip level detected by the sync tip level detecting means and the pedestal level detected by the pedestal level detecting means, setting a slice level corresponding to an intermediate value between the sync tip level and the pedestal level, wherein the slice level setting means set the slice level based on the minimum level detected by the minimum level detecting means if the slice level set based on the sync tip level and the pedestal level is inappropriate.

According to the present invention, if the slice level determined from the sync tip level and the pedestal level is inappropriate, the slice level determined from the minimum level can be adopted.

DESCRIPTION OF PREFERRED EMBODIMENT

An embodiment of the present invention will be described with reference to the drawings.

Figure 1:
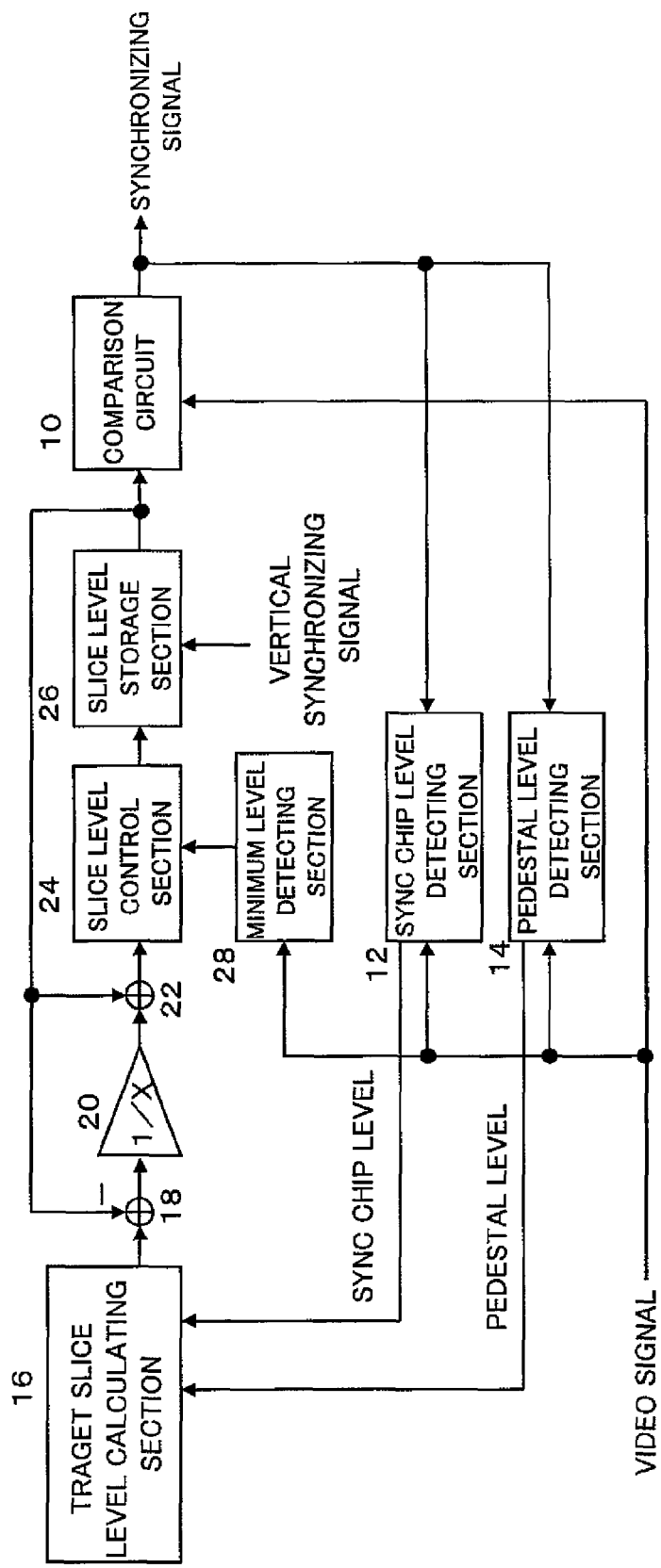
FIG. 1 is a diagram showing the configuration of an embodiment of the present invention.

FIG. 1 is a block diagram showing the configuration of this embodiment. A video signal is supplied to a comparison circuit 10. A slice level is supplied to the comparison circuit 10. The comparison 10 thus slices the video signal based on the slice level and extracts a part of the video signal which is at a level equal to or lower than the slice level, to detect a horizontal synchronizing signal and a vertical synchronizing signal. The detected synchronizing signals are output by the comparison circuit and used to reproduce a video signal. The horizontal and vertical synchronizing signals are individually detected in the separated synchronizing signal and utilized for various processes.

The detected horizontal synchronizing signal is supplied to a sync tip level detecting section 12, which detects a sync tip level based on the level of a video signal obtained a predetermined interval after a fall in the horizontal synchronizing signal. The horizontal synchronizing signal is also supplied to a pedestal level detecting section 14, which detects a pedestal level based on the level of a video signal obtained a predetermined interval after a rise in the horizontal synchronizing signal.

The detected sync tip level and pedestal level are input to a target slice level calculating section 16, which sets a target slice level to an intermediate value between the input synch chip level and pedestal level. For example, the target slice level is positioned midway between the synch chip level and pedestal level but may be positioned a quarter of the difference between the two levels away from either of the levels. With the adverse effect of noise or the like taken into account, the target slice level is appropriately set to a value that is not very close to either of the levels.

The target slice level is supplied to an adder 18, which subtracts the current slice level from the target slice level to obtain the difference between the two levels. An output from the adder 18 is supplied to a gain control section 20, which multiplies the output by a predetermined gain. For example, the gain is 1/X, where X>1. The gain decreases with an increasing value of X, enabling slice level control with a large time constant. The value of X may be varied depending on the value of the difference.

An output from the gain control section 20 is supplied to an adder 22, which adds the current slice level to the output to obtain a new slice level. The new slice level is supplied to a slice level control section 24.

Here, the new slice level is calculated for each horizontal interval. However, it is expected not to be preferable that the slice level to be actually used be varied for each horizontal interval. The slice level control section 24 calculates one new slice level using, for example, a technique of determining the average value of all or some of the levels for each vertical interval (each field).

Then, the new slice level is supplied to a slice level storage section 26 and updated for each vertical interval. The slice level stored in the slice level storage section 26 is supplied to the comparison circuit 10.

Moreover, the video signal is supplied to a minimum level detecting section 28, which detects the minimum level for each horizontal line. The detected minimum level is supplied to the slice level control section 24. The slice level control section 24 adds an appropriate value α to the supplied minimum level to generate a slice level calculated from the minimum level. The minimum level almost corresponds to the sync tip level. Thus, α may be determined such that based on the normal sync tip level and pedestal level, the slice level has the intermediate value between the normal sync tip level and pedestal level.

Here, when the circuit operation is started up, a slice level has not been determined, and neither the sync tip level nor the pedestal level have been obtained. On the other hand, provision of a video signal allows the minimum level detecting section 28 to detect the minimum level. Thus, when the system is started up, the slice level control section 24 adopts the slice level calculated from the minimum level and supplies and stores the slice level to and in the slice level storage section 26. Furthermore, even upon determining that the target slice level is inappropriate, the slice level control section 24 adopts the slice level calculated from the minimum level and supplies and stores the slice level to and in the slice level storage section 26. The determination of the inappropriateness of the target slice level causes the detected sync tip level and pedestal level to be supplied to the slice level control section 24.

Figure 2:
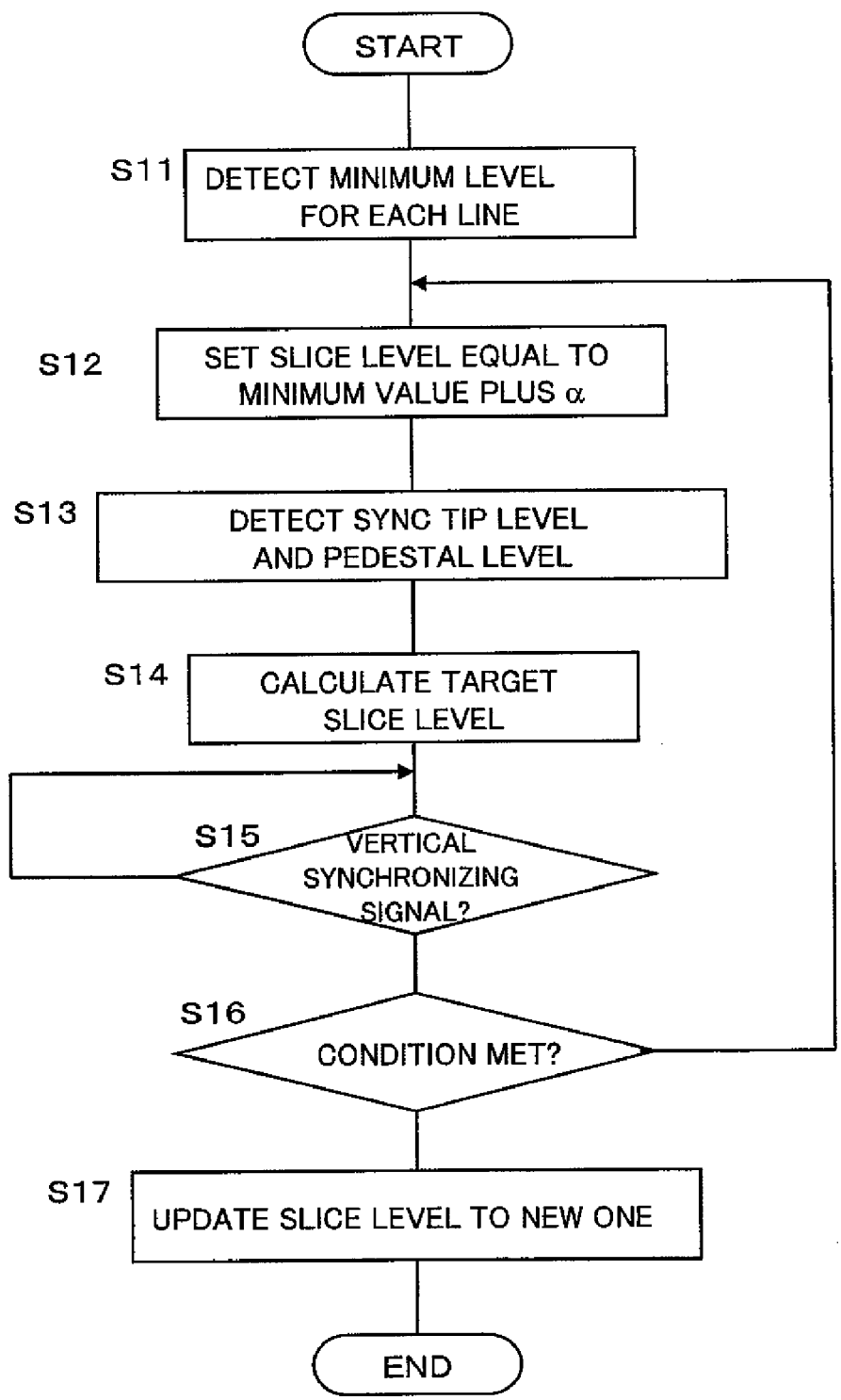
FIG. 2 is a flowchart illustrating the operation of the embodiment.

The operation of setting the slice level will be described with reference to FIG. 2. First, the minimum level detecting section 28 detects the minimum level of the video signal for each horizontal line (S11). The detected minimum level is supplied to the slice level control section 24, which adds α to the supplied minimum level to obtain a slice level. The slice level obtained is stored in the slice level storage section 26 (S12). Based on the slice level set in the slice level storage section 26, the comparison circuit 10 separates the synchronizing signal from the video signal. The sync tip level detecting section 12 and the pedestal level detecting section 14 then detects the sync tip level and the pedestal level (S13).

The target slice level calculating section 16 calculates the target slice level based on the detected sync tip level and pedestal level (S14). Then, upon detecting the vertical synchronizing signal, the slice level section 24 determines whether or not the sync tip level, the pedestal level, and the current slice level meet a condition (S16). That is, the slice level control section 24 determines whether or not the condition "sync tip level<slice level<pedestal level" is met. The sync tip level and the pedestal level may each be the average of the levels during one vertical interval or several horizontal intervals, and has only to be data based on which the target slice level can be calculated. On the other hand, the slice level is the one currently utilized. Thus, thus the slice level section 24 can immediately determine if the slice level has become inappropriate as a result of significant variation in input video signal.

If the slice level section 24 determines in S15 that the condition is not met, the process returns to S12, where the slice level determined from the minimum level is stored in the slice level storage section 26. Then, the slice level can be reset to a value compatible with the current video signal.

On the other hand, if the slice level section 24 determines at S15 that the condition is met, a new slice level corresponding to the current slice level made closer to the target slice level using a predetermined time constant is stored in the slice level storage section 26 (S17). Thus, the slice level in the slice level storage section 26 is updated to the new one. The updated slice level is further supplied to the adders 18 and 22.

Preferably, the minimum level is detected for each horizontal line, and the slice level determined from the minimum level is stored in the slice level storage section 26 for each vertical interval. In this case, if the determination is NO in S15, the process may return to S11, and in S12, the minimum level obtained one horizontal interval later and to which α is added may be stored in the slice level storage section 26.

Thus, according to the present embodiment, if the set slice level is inappropriate, the slice level determined from the minimum level of the video signal is adopted. Then, if the video signal varies, the slice level can be reset early. Furthermore, since the slice level is changed using the predetermined time constant, the circuit can effectively avoid being affected by noise or the like.

What is claimed is:

1. A sync separation circuit separating a synchronizing signal from a video signal containing the synchronizing signal, the circuit comprising:
    a minimum level detecting circuit which detects a minimum level of a video signal;
    a sync tip level detecting circuit which detects a sync tip level in the video signal;
    a pedestal level detecting circuit which detects a pedestal level in the video signal; and
    a slice level control circuit which sets a slice level to an initial slice level corresponding to the minimum level and subsequently, based on the synchronizing signal obtained after sync separation utilizing the initial slice level, detects the sync tip level and the pedestal level and sets the slice level to a subsequent slice level corresponding to an intermediate value between the sync tip level and the pedestal level,
    wherein, upon detecting a vertical synchronization signal, the slice level control circuit determines that the subsequent slice level is inappropriate, the slice level control circuit sets the slice level to a new slice level based on the minimum level, and
    wherein, upon detecting a vertical synchronization signal, the slice level control circuit determines that the subsequent slice level is appropriate, the slice level control unit sets the slice level to a new slice level corresponding to the subsequent slice level made closer to a target slice level using a predetermined time constant, wherein the target slice level corresponds to an intermediate value between the sync tip level and the pedestal level.

2. The sync separation circuit according to claim 1, wherein the slice level control circuit sets a new slice level based on the sync tip level and the pedestal level by setting a target slice level based on the detected sync tip level and pedestal level and making the subsequent slice level closer to the target value using a predetermined time constant.

3. The sync separation circuit according to claim 2, wherein when the currently set slice level is not positioned midway between the detected sync tip level and pedestal level, the slice level control circuit determines the currently set slice level to be inappropriate and adopts the initial slice level corresponding to the minimum level.

* * * * *